J. T. WANN.
DRYING TRAY.
APPLICATION FILED AUG. 27, 1919.
1,367,443.
Patented Feb. 1, 1921.
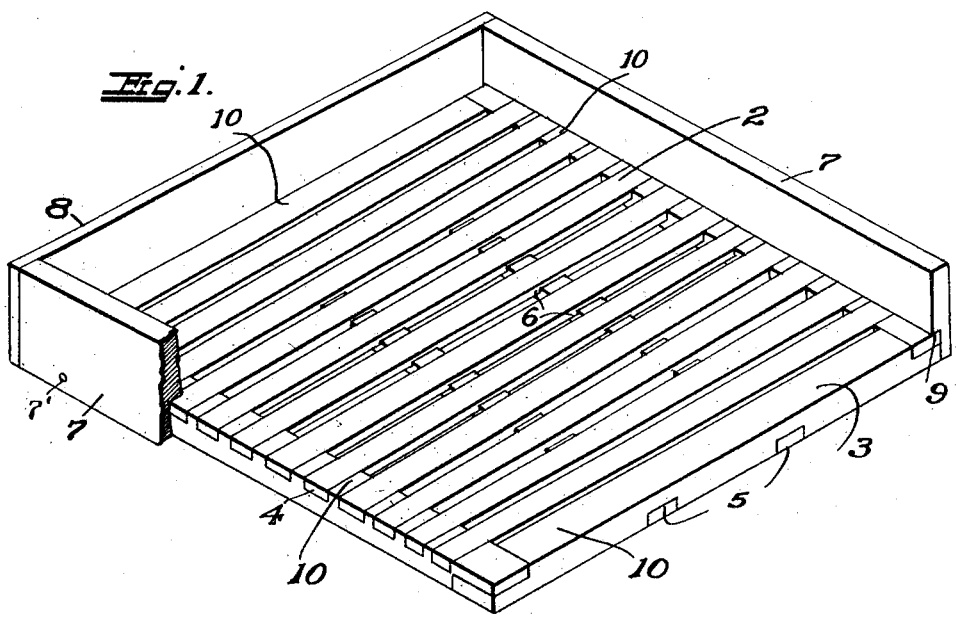
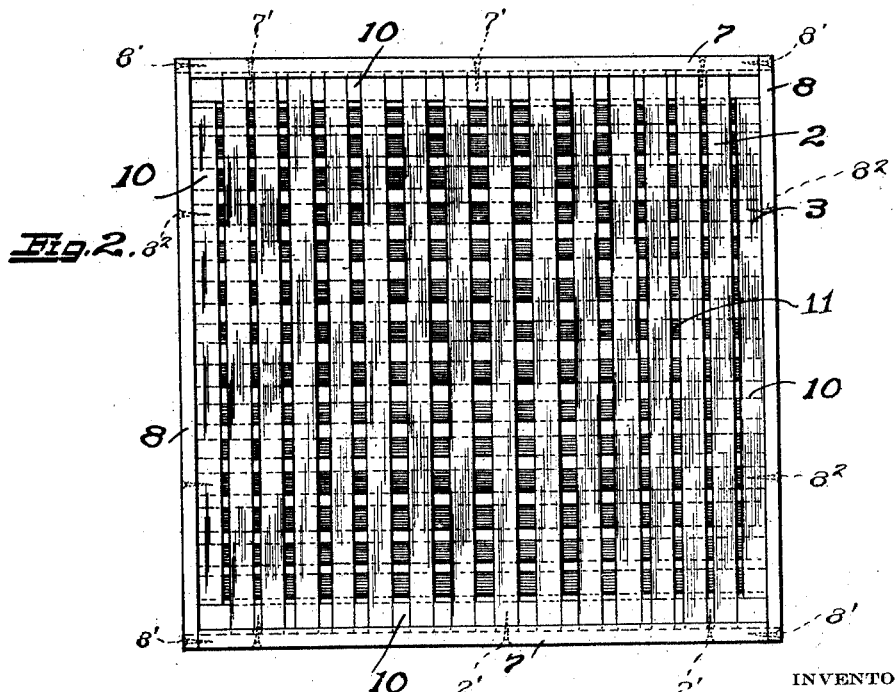
INVENTOR
John T. Wann
BY Strong & Townsend
ATTORNEYS

UNITED STATES PATENT OFFICE.

JOHN T. WANN, OF BERKELEY, CALIFORNIA, ASSIGNOR TO PACIFIC WANN EVAPORATOR CO., OF SAN FRANCISCO, CALIFORNIA, A COPARTNERSHIP COMPOSED OF ROBERT C. NEWELL, WM. C. MURDOCK, JR., JOHN T. WANN, AND EMERSON R. WANN.

DRYING-TRAY.

1,367,443.  Specification of Letters Patent.  Patented Feb. 1, 1921.

Application filed August 27, 1919. Serial No. 320,103.

*To all whom it may concern:*

Be it known that I, JOHN T. WANN, a citizen of the United States, residing at Berkeley, in the county of Alameda and State of California, have invented new and useful Improvements in Drying-Trays, of which the following is a specification.

This invention relates to a tray and especially to that type known as drying trays.

In the drying of fruits, vegetables and other food products by means of hot air, it has become more or less a common practice to support the product to be dried upon trays provided with a perforated bottom. For instance, such as may be formed by means of a screen, slats or the like, to permit the free circulation of air upwardly or downwardly through the trays as the case may be.

In actual practice it is exceedingly difficult, if not impossible, to obtain a product which is uniformly dry when employing trays of this character. By observation, I have discovered when removing trays from a drying chamber which are loaded with fruit or some other product that the fruit around the outer edges of the tray is dryer than that in the center and that this is due largely to the absorbing and conducting qualities of the tray proper, particularly if constructed of wood, *i. e.*, fruit in the center of the tray is entirely surrounded by moist fruit and can therefore only dry as quickly as the circulating air will carry away the moisture, while the fruit around the edges will not only dry by the action of the air, but also by heat conducted to it by the tray and conversely moisture absorbed by the tray. I have, therefore, constructed a tray whereby the circulation of air may be so regulated that the flow of air through the tray gradually decreases toward the outer edges.

To accomplish this I will refer to the accompanying drawings in which:—

Figure 1 is a perspective view of one form of the tray partly broken away.

Fig. 2 is a plan view of another form of the tray.

Referring to the drawings in detail and particularly Fig. 1, I have provided a tray the bottom portion of which is constructed of slats. The slats indicated at 2 run lengthwise of the tray and are secured in a square or rectangular shaped bottom frame 3. This frame is dovetailed or channeled at each end, as shown at 4, permitting the tops of the slats to form a flush surface with the surface of the frame 3. To prevent bending of the slats when subjected to a comparatively heavy load, I have provided a pair of reinforcing or supporting slats 5. These extend cross-wise of the tray and are secured therein in a manner similar to the slats 2, the upper surface of these reinforcing slats 5 may be channeled as shown at 6 to receive the slats 2 and to maintain a predetermined spacing between the same. The tray is completed by means of edge strips 7 and 8, the strips 7 being disposed at each end of the tray and the strips 8 on each side thereof. The strips 7 are recessed along their lower edges as shown at 9 to partially overlap the upper surface of the frame 3 and the slats 2 supported thereby as illustrated by Fig. 1. The overlapping edge formed by recessing the end strips 7 thereby serves as a means for securing the slats 2 against removal, and it also permits broken slats to be removed and new ones to be inserted by merely springing the same into place. The strips 7 are nailed directly to the frame 3 as indicated at 7' while the strips 8 are nailed to the end strips 7 and to the frame as indicated at 8' and 8². One of the important features of the construction shown is the spacing formed between the slats 2.

By referring to Fig. 1, it will be seen that the spacing gradually decreases toward the sides. This is of great importance, as it decreases the flow of air through the tray toward the outer edges and permits a freer flow of air through the center portion of the same.

In Fig. 1 is merely shown a decrease in the spacing of the slats toward each side. This is only necessary as the tray shown is employed in a drier where the air is admitted from the side. I, however, employ a tray such as shown in Fig. 2, when the air is directed upwardly or downwardly through the trays. It is then important that the spacing between the slats decrease in area toward all sides. This is accomplished by providing slats 11 which are a duplicate of the set of slats 2 inserted or secured transversely thereof similar to the supporting slats 5 shown in Fig. 1.

Another important feature of the present invention is the provision of the rectangular frame 3, as it serves as a means for forming a shelf or ledge surface such as indicated at 10, around the exterior sides of the tray. This stops any flow of air around the exterior edges and as it serves as a support for the product to be dried, it can readily be seen that the outer edges of the product will not have a tendency to curl up and over-dry.

While a more or less specific construction is here shown, I wish it understood that changes in proportion, construction and design may be resorted to within the scope of the appended claims; similarly, that the materials and finish of the several parts employed may be such as the experience and judgment of the manufacturer may dictate and varying uses or conditions may demand.

Having thus described my invention what I claim and desire to secure by Letters Patent is:

1. A drying tray provided with a perforated bottom for the support of a product to be dried and to permit circulation of air through the tray, said perforation being so arranged as to gradually decrease a flow of air toward the outer edges of the tray.

2. A drying tray provided with a perforated bottom for the support of a product to be dried and to permit circulation of air through the tray, said perforations being gradually reduced in area toward the outer edges of the tray to gradually obstruct a flow of air toward the outer edges.

3. A drying tray provided with a bottom section consisting of interspaced slats, the spacing between the slats being gradually reduced toward the outer edges of the tray.

4. A drying tray provided with a perforated bottom for the support of a product to be dried and to permit circulation of air through the tray, said perforations being gradually reduced in area toward the outer edges of the tray to gradually obstruct a flow of air toward the outer edges, and a shelf formed around the exterior sides of the tray.

In testimony whereof I have hereunto set my hand in the presence of two subscribing witnesses.

JOHN T. WANN.

Witness:
 THOS. CASTBERG,
 W. W. HEALEY.